United States Patent
Hosseinimakarem

(10) Patent No.: US 12,177,578 B2
(45) Date of Patent: Dec. 24, 2024

(54) STACKED POLARIZER HYPERSPECTRAL IMAGING

(71) Applicant: Micron Technology, Inc., Boise, ID (US)

(72) Inventor: Zahra Hosseinimakarem, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/986,611

(22) Filed: Nov. 14, 2022

(65) Prior Publication Data

US 2023/0077066 A1 Mar. 9, 2023

Related U.S. Application Data

(63) Continuation of application No. 17/021,139, filed on Sep. 15, 2020, now Pat. No. 11,503,225.

(51) Int. Cl.
*H04N 23/75* (2023.01)
*G02B 5/30* (2006.01)
*H04N 23/45* (2023.01)

(52) U.S. Cl.
CPC ........... *H04N 23/75* (2023.01); *G02B 5/3041* (2013.01); *H04N 23/45* (2023.01)

(58) Field of Classification Search
CPC ........ H04N 23/75; H04N 23/45; H04N 23/55; H04N 23/60; G02B 5/3041
See application file for complete search history.

(56) References Cited

U.S. PATENT DOCUMENTS 9,305,948 B2 * 4/2016 Wehner ............... G02B 27/288
10,168,210 B2 1/2019 Zhang et al.
(Continued)

FOREIGN PATENT DOCUMENTS

CN 109827910 5/2019
JP 2018-059913 4/2018
(Continued)

OTHER PUBLICATIONS

International Search Report and Written Opinion from related international application No. PCT/US2021/050197, dated Jan. 3, 2022, 9 pages.

*Primary Examiner* — Ahmed A Berhan
*Assistant Examiner* — Fayez A Bhuiyan
(74) *Attorney, Agent, or Firm* — Brooks, Cameron & Huebsch, PLLC

(57) ABSTRACT

Embodiments of the present disclosure include apparatuses and methods for stacked polarizer hyperspectral imaging. In a number of embodiments, a method can include passing a light source input through a lens and a hyperspectral sensor, activating a first polarization layer of a plurality of polarization layers, detecting a first hyperspectral image with an array of pixels from the light source input that is polarized when passed through the first polarization layer, and determining, via a controller coupled to the array of pixels, whether a quality of the first hyperspectral image that was polarized by the first polarization layer meets a threshold. A stacked polarizer can include a plurality of polarizers that are stacked upon each other such that a hyperspectral light source input can be pass through the stack of polarizers and be detected by a pixel of an image sensor cell. Each of the polarizers in the stack of polarizers can be individually activated and deactivated.

20 Claims, 5 Drawing Sheets

(56) References Cited

U.S. PATENT DOCUMENTS

| | | |
|---|---|---|
| 10,768,497 B2 | 9/2020 | Herloski |
| 10,924,689 B1 * | 2/2021 | Duckett, III ......... H04N 25/134 |
| 11,503,225 B2 * | 11/2022 | Hosseinimakarem ...................... G02B 5/3041 |
| 11,668,604 B2 * | 6/2023 | Hosseinimakarem ...................... G02B 5/3041 356/491 |
| 2007/0177084 A1 * | 8/2007 | Ishitani ............. G02F 1/133528 349/96 |
| 2012/0212587 A1 | 8/2012 | Otani |
| 2016/0345888 A1 | 12/2016 | Wu et al. |
| 2017/0038258 A1 | 2/2017 | Hegyi et al. |
| 2018/0095307 A1 * | 4/2018 | Herloski ............. H04N 1/6044 |
| 2019/0170923 A1 | 6/2019 | Okazaki |
| 2020/0243735 A1 | 7/2020 | Lee et al. |
| 2020/0244946 A1 | 7/2020 | Wang et al. |
| 2020/0251049 A1 | 8/2020 | Morris et al. |
| 2020/0251460 A1 | 8/2020 | Iguchi |
| 2020/0258869 A1 | 8/2020 | Wu et al. |
| 2020/0264441 A1 | 8/2020 | Lee et al. |
| 2021/0067716 A1 * | 3/2021 | Zhou ..................... H04N 23/75 |
| 2021/0082725 A1 | 3/2021 | Jung et al. |
| 2021/0084284 A1 | 3/2021 | Mceldowney |

FOREIGN PATENT DOCUMENTS

| | | |
|---|---|---|
| JP | 2018-513964 | 5/2018 |
| JP | 2018-200257 | 12/2018 |

* cited by examiner

_US 12,177,578 B2_

STACKED POLARIZER HYPERSPECTRAL IMAGING

PRIORITY INFORMATION

This application is a continuation of U.S. application Ser. No. 17/021,139, filed on Sep. 15, 2020, then contents of which are incorporated herein by reference.

TECHNICAL FIELD

The present disclosure relates generally to apparatuses, non-transitory machine-readable media, and methods for stacked polarizer hyperspectral imaging

BACKGROUND

Images can be captured by an imaging system that can include light capturing devices such as lenses and the imaging system converts the light to electrical signals that is stored and viewed on computing devices as an image. A computing device is a mechanical or electrical device that transmits or modifies energy to perform or assist in the performance of human tasks. Examples include thin clients, personal computers, printing devices, laptops, mobile devices (e.g., e-readers, tablets, smartphones, etc.), internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A computing device can include sensors, such as an image sensor, to capture image data and a display used to view images and/or text. The display can be a touchscreen display that serves as an input device. When a touchscreen display is touched by a finger, digital pen (e.g., stylus), or other input mechanism, associated data can be received by the computing device.

DETAILED DESCRIPTION

Figure 1:
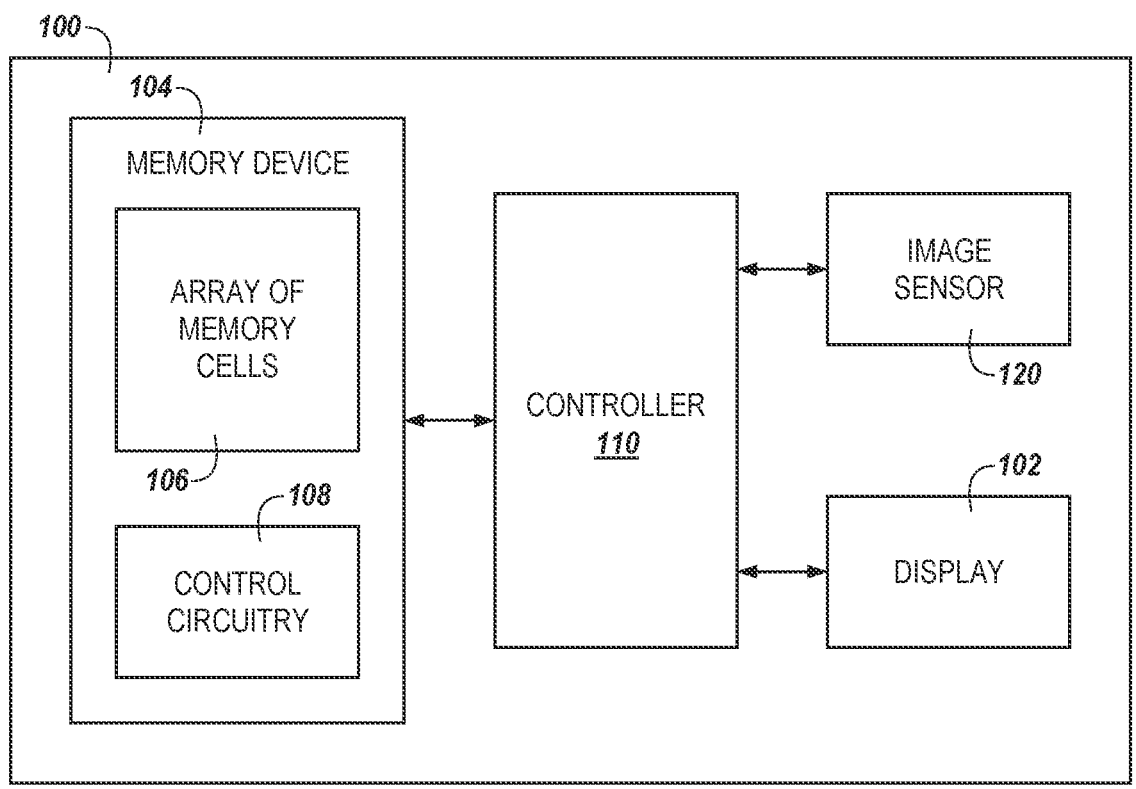
FIG. 1 is a functional block diagram in the form of an apparatus having a display, an image sensor, a memory device, and a controller in accordance with a number of embodiments of the present disclosure.

Embodiments of the present disclosure include apparatuses and methods for stacked polarizer hyperspectral imaging. In a number of embodiments, a method can include passing a light source input through a lens and a hyperspectral sensor, activating a first polarization layer of a plurality of polarization layers, detecting a first hyperspectral image with an array of pixels from the light source input that is polarized when passed through the first polarization layer, and determining, via a controller coupled to the array of pixels, whether a quality of the first hyperspectral image that was polarized by the first polarization layer meets a threshold. A stacked polarizer can include a plurality of polarizers that are stacked upon each other such that a hyperspectral light source input can be pass through the stack of polarizers and be detected by a pixel of an image sensor cell. Each of the polarizers in the stack of polarizers can be individually activated and deactivated. For example, in an array of image sensor cells, a first polarizer of each image sensor cell can be activated and the other polarizers can be deactivated such that a hyperspectral light source input can pass through the stack of polarizers and be polarized by the first polarizer and image sensor cells can capture a hyperspectral image that is polarized with the first polarizer. This process can continue by activating a second polarizer of each image sensor cell and deactivating the other polarizers, such that a hyperspectral image that is polarized with the second polarizer can be captured.

A stacked polarizer can be used to capture hyperspectral images with different polarizations, while not increasing the footprint of an image sensor. The hyperspectral sensor and the stacked polarizer can be positioned in front of a pixel of an image sensor cell to capture polarized hyperspectral images and have a footprint that is no larger than the pixel.

As used herein, designators such as "N," "M," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 120 can reference element "20" in FIG. 1, and a similar element can be referenced as 220 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system including an apparatus 100 having a display 102, an image sensor 120, a memory device 104, and a controller 110 (e.g., a processor, control circuitry, hardware, firmware, and/or software) in accordance with a number of embodiments of the present disclosure. The memory device 104, in some embodiments, can include a non-transitory machine readable medium (MRM) configured to store instructions that can be executed by controller 110 to perform embodiments of the present disclosure.

The apparatus 100 can be a computing device and, for instance, the display 102 may be a touchscreen display of a mobile device such as a smartphone. The controller 110 can be communicatively coupled to the memory device 104, image sensor 120, and/or the display 102. As used herein, "communicatively coupled" can include coupled via various wired and/or wireless connections between devices such that data can be transferred in various directions between the devices. The coupling need not be a direct connection, and in some examples, can be an indirect connection.

The memory device 104 can include non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory (e.g., 3D XPoint™), resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random access memory (SRAM), among others. Memory device 104 can include an array of memory cells 106 configured to store bits of data and control circuitry 108 configured to perform operations on the memory device 104 (e.g., read, write, erase bits of data in the array of memory cells 106).

Apparatus 100 can include an image sensor 120. For example, image sensor 120 can be part of a camera of a mobile device. The image sensor 120 can generate images (video, text, etc.) which can be visible on the display 102. Image sensor 120 can include a stack polarizer that includes a number of polarizers that can be used individually or in combination to polarize a light source input for the image sensor to capture polarized image data. Additionally, the image sensor 120 can capture and/or receive input from objects, people, items, etc. and transmit that input to the controller 110 to be analyzed. In some examples, the images sensor 120 can be part of a camera and can provide input to the controller 110, such as facial recognition input. For example, the display 102 can be a portion of a mobile device including a camera (e.g., a smartphone). Image sensor 120 can capture hyperspectral image data using a hyperspectral sensor that is included in each image sensor cell. The hyperspectral sensor can capture hyperspectral image data that includes spatial and spectral data such that each pixel of an image represents a continuous radiance and/or reflectance spectrum.

Figure 2:
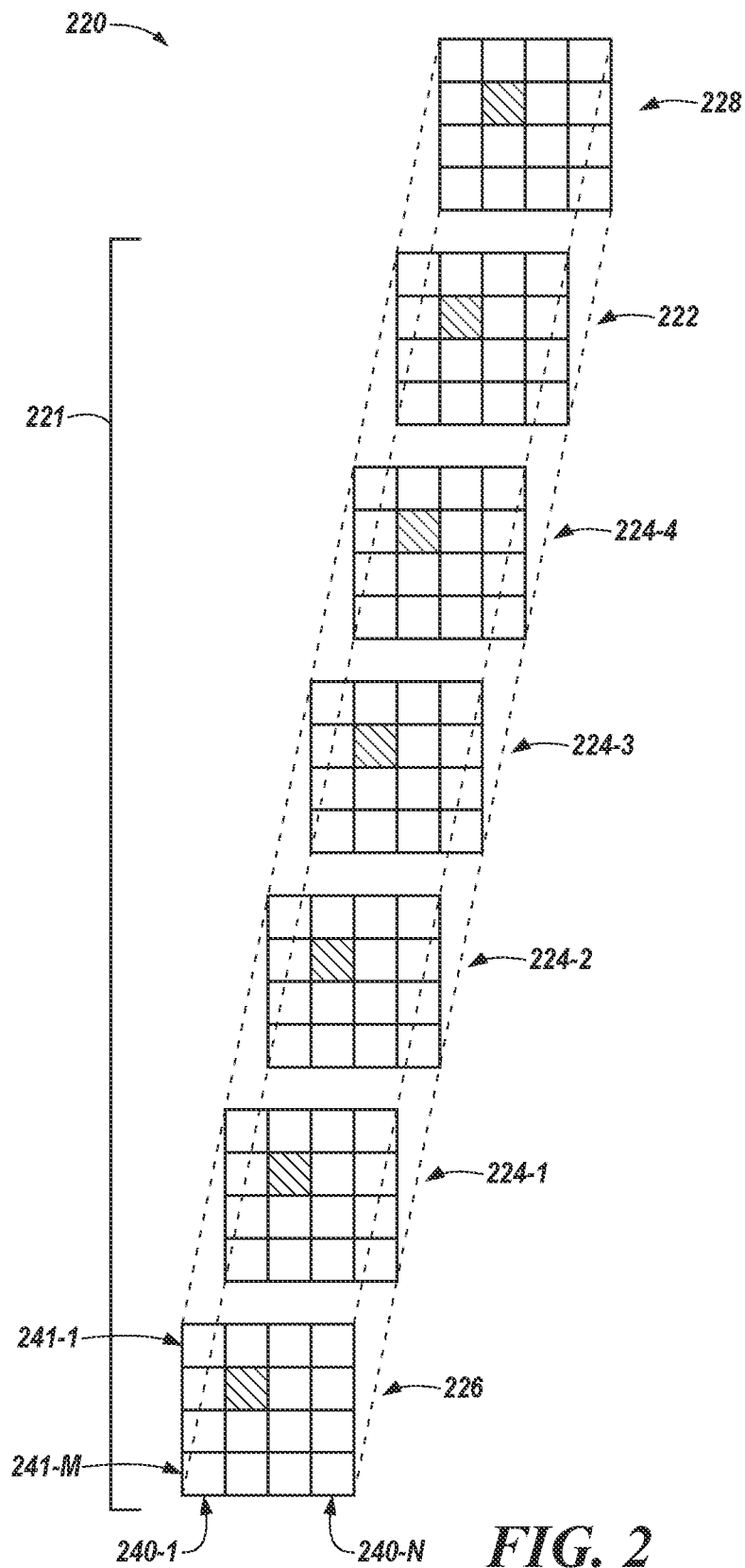
FIG. 2 is a functional block diagram of an image sensor including an array of image sensor cells in accordance with a number of embodiments of the present disclosure.

FIG. 2 is a functional block diagram of an image sensor 220 including an array of image sensor cells 221 in accordance with a number of embodiments of the present disclosure. The array of image sensor cells 221 can include a portion including an array of hyperspectral sensors 228 (e.g., hyperspectral sensor layer), an array of lenses 222 (e.g., lens layer), stacked polarizers comprising a portion including an array of first polarizers 224-1 (e.g., first polarization layer), a portion including an array of second polarizers 224-2 (e.g., second polarization layer), a portion including an array of third polarizers 224-3 (e.g., third polarization layer), a portion including an array of fourth polarizers 224-4 (e.g., fourth polarization layer), and a portion including an array of pixels 226 (e.g., pixel layer). Each array of hyperspectral sensors, lenses, first polarizers, second polarizers, third polarizer, fourth polarizers, and pixels can include a number of rows 141-1, ..., 141-M and a number of columns 140-1, ..., 140-N, where the array of image sensor cells 221 includes N×M image sensor cells. For example, each image sensor cell of the array of image sensor cells 221 includes a hyperspectral sensor, a lens, a first polarizer, a second polarizer, a third polarizer, a fourth polarizer, and a pixel. As shown in FIG. 2, an image sensor cell at the intersection of column 2 and row 2 is shaded and includes hyperspectral sensor, a lens, a first polarizer, a second polarizer, a third polarizer, a fourth polarizer, and a pixel.

In a number of embodiments, the array of first, second, third, and fourth polarizer layers can each include a plurality (e.g., N×M) of polarizers that are associated with image sensor cells, such that each image sensor cell can include a first polarizer, a second polarizer, a third polarizer, and a fourth polarizer that can each be individually activated and deactivated.

The array of pixels can be configured to capture hyperspectral image data. For example, hyperspectral sensor can generate hyperspectral light source inputs that can be polarized by the stacked polarizer. The pixels in the array of pixels can capture the polarized hyperspectral light source inputs to capture hyperspectral polarized image data. For example, the array of image sensor cells includes a first portion of pixels configured to detect image data within a first range of wavelengths, a second portion of pixels configured to detect image data within a second range of wavelengths, and a third portion of pixels configured to detect image data within a third range of wavelengths.

Figure 3:
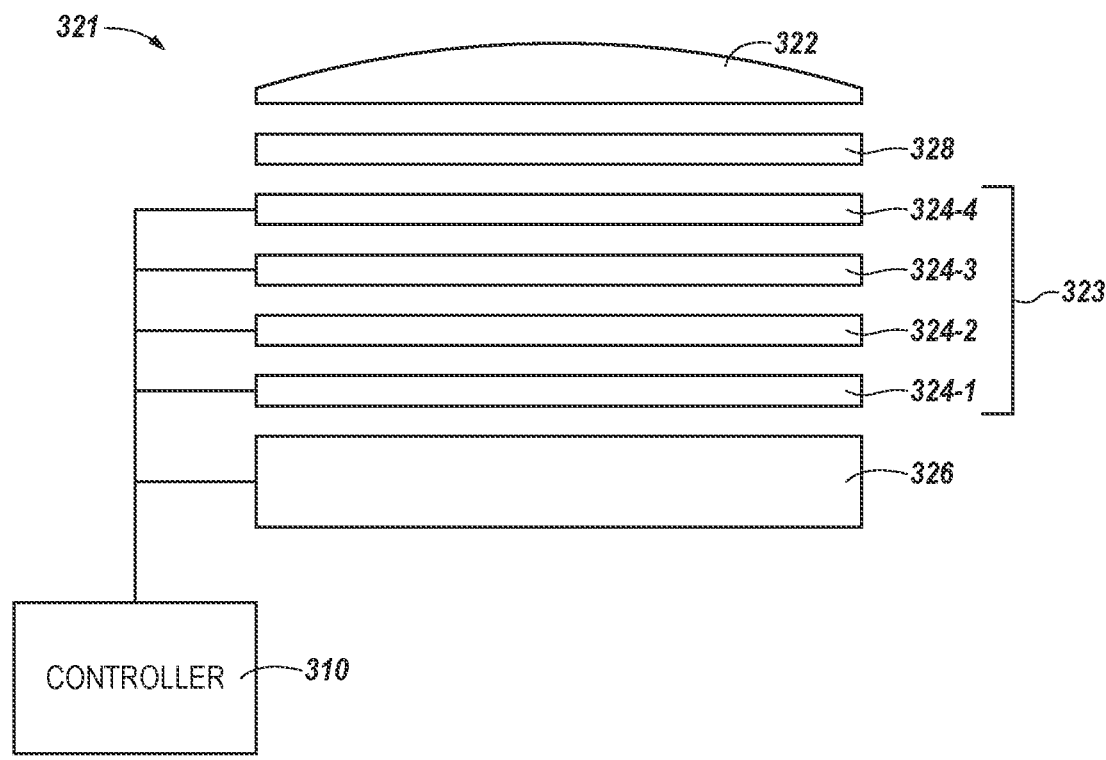
FIG. 3 is a functional block diagram of an image sensor cell in accordance with a number of embodiments of the present disclosure.

FIG. 3 is a functional block diagram of an image sensor cell 327 in accordance with a number of embodiments of the present disclosure. For example, image sensor cell 327 can be from an array of image sensor cells (e.g. array of image sensor cells 221 in FIG. 2). The image sensor cell 327 can include a lens 322, a hyperspectral sensor 328, a stacked polarizer 323, and a pixel 326. Lens 322 can be configured to direct and focus a light source through hyperspectral sensor 328 and stacked polarizer 323 and onto a photo diode portion of pixel 326. Stacked polarizer 323 can include a first polarizer 324-1, a second polarizer 324-2, a third polarizer 324-3, and a fourth polarizer 324-4. First polarizer 324-1, second polarizer 324-2, third polarizer 324-3, and fourth polarizer 324-4 can be coupled to controller 310 and can be configured to receive signals from controller 310 to activate and deactivate the polarizers.

In a number of embodiments, controller 310 can send a signal or signals to individually activate and/or deactivate the first, second, third, and fourth polarizers. For example, the first polarizer 324-1 can be activated and the second, third, and fourth polarizers 324-2, 324-3, and 324-4 can be deactivated. A hyperspectral light source generated by hyperspectral sensor 328 can pass through the activated first polarizer 324-1 and deactivated second, third, and fourth polarizers 324-2, 324-3, and 324-4 and the first polarizer 324-1 can polarize the light source and the pixel 326 can detect the light source and generate image data representing the light source. Hyperspectral sensor 328 can generate a hyperspectral light source based on wavelength hyperspectral scanning, line hyperspectral scanning, and/or single shot hyperspectral scanning, among other types of hyperspectral imaging types. Hyperspectral sensor can generate a hyperspectral light source inputs with a plurality of wavelengths such that each pixel can detect an image that represents a continuous radiance and/or reflectance spectrum. The image data representing the light source can be hyperspectral image data sent to the controller 310 for further processing, such as analyzing the quality of the image data, and then can be sent to a memory device (e.g., memory 104 in FIG. 1) to store bits representing the image data. In a number of embodiments, the first, second, third, and fourth polarizers 324-1 324-2, 324-3, and 324-4 can be deactivated, and pixel 326 can detect the light source and generate unpolarized image data.

Figure 4:
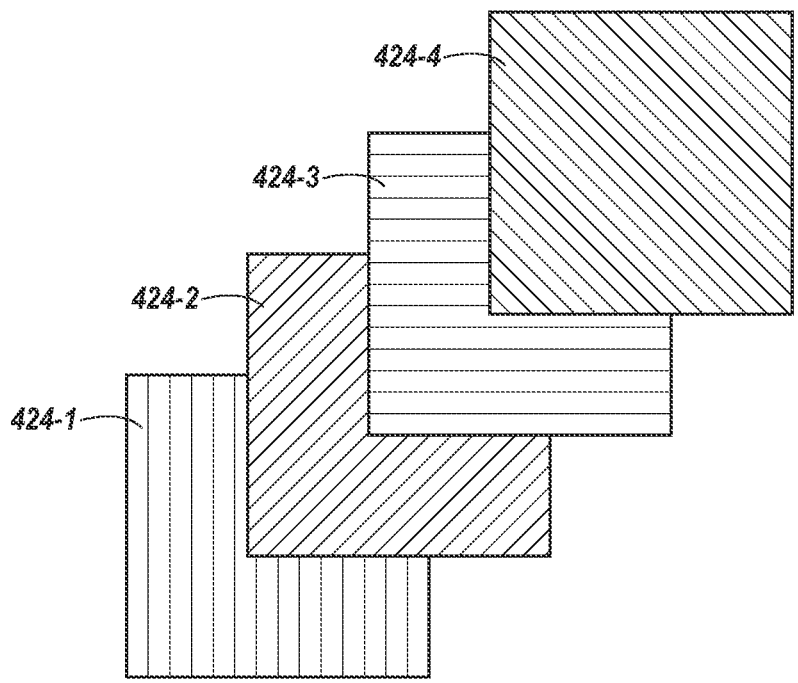
FIG. 4 is a functional block diagram of a stacked polarizer in accordance with a number of embodiments of the present disclosure.

FIG. 4 is a functional block diagram of a stacked polarizer in accordance with a number of embodiments of the present disclosure. Stacked polarizer 423 can include a first polarizer 424-1, a second polarizer 424-2, a third polarizer 424-3, and a fourth polarizer 424-4. First polarizer 424-1 can be configured to polarize light sources at 0°, second polarizer 424-2 can be configured to polarize light sources at 45°, third polarizer 424-3 can be configured to polarize light at 90°, and fourth polarizer 424-4 can be configured to polarize light at 135°. Stacked polarizer can include any number of polarizers that can be configured to polarize light sources at any angle. Stacked polarizer 423 can include a number of polarizers that are coupled to a controller to individually activate and deactivate the number of polarizers. In a number of embodiments, a stacked polarizer can include any number of polarizers. For example, a stacked polarizer could include 2 polarizers or 5 polarizers, among any other number of polarizers. Also, the polarizers can be configured to polarize light at any degree and are not limited to 0°, 45°, 90°, and 135°.

Figure 5:
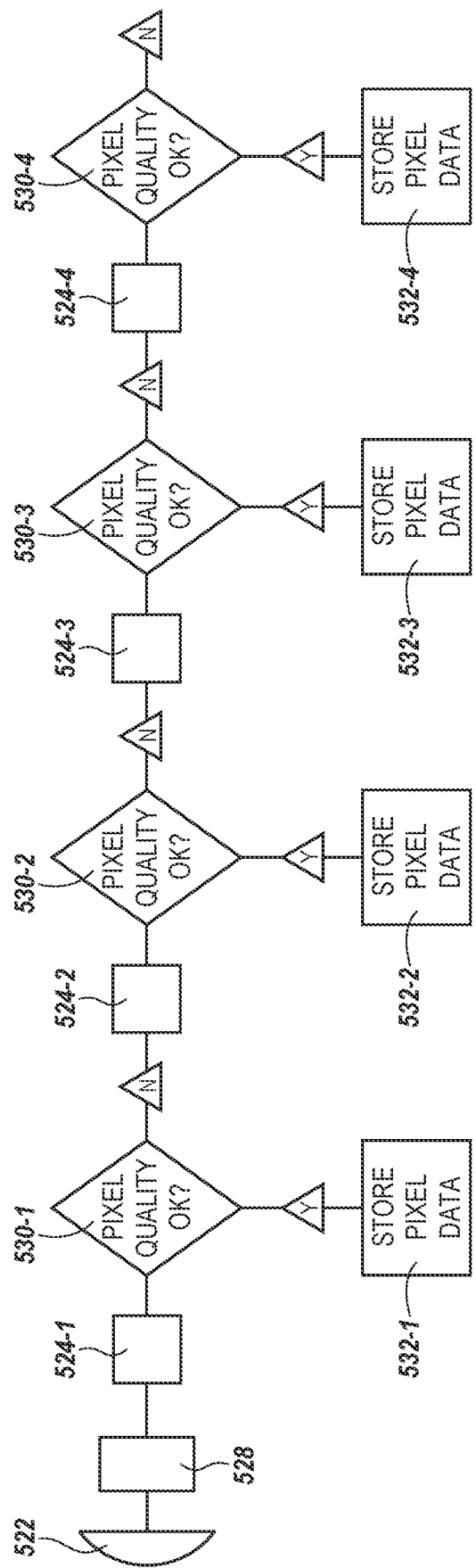
FIG. 5 is flow diagram illustrating an example stacked polarizer imaging process in accordance with a number of embodiments of the present disclosure.

FIG. 5 is flow diagram illustrating an example stacked polarizer imaging process in accordance with a number of embodiments of the present disclosure. In FIG. 5, an image sensor can receive a light source input. The image sensor cells of the image sensor can be used to capture image data to represent the image based on the light source input. The light source input can be passed through lens 522 and hyperspectral sensor 528. Hyperspectral sensor 528 can generate a hyperspectral lights source input that is passed to the polarizers. First polarizer 524-1 can be activated to polarize the hyperspectral light source input and the image sensor cell can generate hyperspectral image data that represents a portion of an image based on the light source input. The hyperspectral image data can be sent to a controller (e.g. controller 110 in FIG. 1 and/or controller 310 in FIG. 3) to determine if the pixel quality is ok 530-1 (e.g., pixel quality meets a threshold). If it is determined that the pixel quality is ok, the pixel data is stored 532-1 in a memory device (e.g., memory device 104 in FIG. 1). If it is determined that the pixel quality is not ok, the pixel data is discarded (e.g., not stored in a memory device. Pixel quality can be based on an intensity of the pixel, which can be measured by a voltage in the image sensor and/or luminance of the display. Pixel quality can also be based on the color gamut, Strehl ratio, among other pixel quality metrics.

Once a determination regarding pixel quality is made for image data polarized with the first polarizer 524-1, second polarizer 524-2 can be activated to polarize the hyperspectral light source input and the image sensor cell can generate hyperspectral image data that represents a portion of an image based on the light source input. The hyperspectral image data can be sent to a controller (e.g. controller 110 in FIG. 1 and/or controller 310 in FIG. 3) to determine if the pixel quality is ok 530-2 (e.g., pixel quality meets a threshold). If it is determined that the pixel quality is ok, the pixel data is stored 532-2 in a memory device (e.g., memory device 104 in FIG. 1). If it is determined that the pixel quality is not ok, the pixel data is discarded (e.g., not stored in a memory device).

Once a determination regarding pixel quality is made for image data polarized with the second polarizer 524-2, third polarizer 524-3 can be activated to polarize the hyperspectral light source input and the image sensor cell can generate hyperspectral image data that represents a portion of an image based on the light source input. The hyperspectral image data can be sent to a controller (e.g. controller 110 in FIG. 1 and/or controller 310 in FIG. 3) to determine if the pixel quality is ok 530-3 (e.g., pixel quality meets a threshold). If it is determined that the pixel quality is ok, the pixel data is stored 532-3 in a memory device (e.g., memory device 104 in FIG. 1). If it is determined that the pixel quality is not ok, the pixel data is discarded (e.g., not stored in a memory device). If it is determined that the pixel quality if not ok, a controller can be configured to interpolate pixel data based on data from nearby pixels.

Once a determination regarding pixel quality is made for image data polarized with the third polarizer 524-3, fourth polarizer 524-4 can be activated to polarize the hyperspectral light source input and the image sensor cell can generate hyperspectral image data that represents a portion of an image based on the light source input. The hyperspectral image data can be sent to a controller (e.g. controller 110 in FIG. 1 and/or controller 310 in FIG. 3) to determine if the pixel quality is ok 530-4 (e.g., pixel quality meets a threshold). If it is determined that the pixel quality is ok, the pixel data is stored 532-4 in a memory device (e.g., memory device 104 in FIG. 1). If it is determined that the pixel quality is not ok, the pixel data is discarded (e.g., not stored in a memory device). In a number of embodiments, if it is determined that the pixel quality is not ok, a controller can be configured to interpolate pixel data based on data from nearby pixels.

Figure 6:
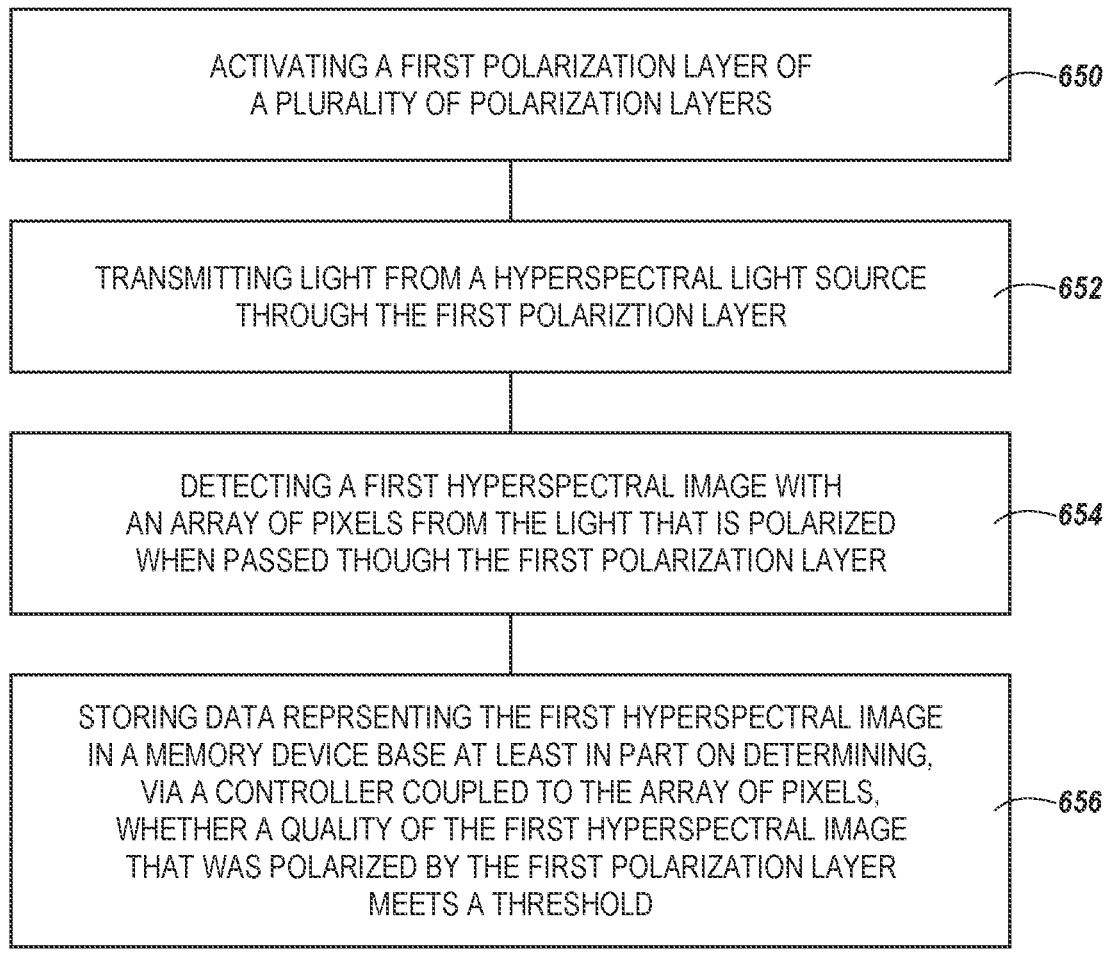
FIG. 6 is flow diagram representing an example method for stacked polarizer imaging in accordance with a number of embodiments of the present disclosure.

FIG. 6 is flow diagram representing an example method for stacked polarizer imaging in accordance with a number of embodiments of the present disclosure. At step 650, the method can include activating a first polarization layer of a plurality of polarization layers. The first polarization layer can be activated by a number of signals from a controller, while the other polarization layers are deactivated.

At step 652, the method can include transmitting light from a hyperspectral light source through the first polarization layer. A hyperspectral sensor can generate a hyperspectral light source input from a light source input.

At step 654, the method can include detecting a first hyperspectral image with an array of pixels from the light that is polarized when passed through the first polarization layer.

At step 656, the method can include storing data representing the first hyperspectral image in a memory device based at least in part on determining, via a controller coupled to the array of pixels, whether a quality of the first hyperspectral image that was polarized by the first polarization layer meets a threshold. The controller can be configured to analyze the quality of the first hyperspectral image to determine whether or not to save the image in a memory device. If the first hyperspectral image meets a threshold, the first hyperspectral image can be saved in a memory device. If the first hyperspectral image does not meet a threshold, the first hyperspectral image can be discarded. The quality analysis by the controller can also be done on the pixel level, where the quality of each pixel in an array of image sensor cells is analyzed and the pixels the meet the threshold are saved to represent an image, while the pixels that do not meet the threshold are discarded. The discarded pixels can be replaced with pixel data that is interpolated by nearby pixels of the image.

The method can continue for the second polarization layer and can also include activating a second polarization layer of a plurality of polarization layers. The second polarization layer can be activated by a number of signals from a controller, while the other polarization layers are deactivated. The method can include detecting a second hyperspectral image with an array of pixels from a hyperspectral light source input that is polarized when passed through the second polarization layer. The method can include determining, via a controller coupled to the array of pixels, whether a quality of the second hyperspectral image that was polarized by the second polarization layer meets a threshold. The controller can be configured to analyze the quality of the second hyperspectral image to determine whether or not to save the image in a memory device. If the second hyperspectral image meets a threshold, the second hyperspectral image can be saved in a memory device. If the second hyperspectral image does not meet a threshold, the second hyperspectral image can be discarded.

The method can continue for third polarization layer and can also include activating a third polarization layer of a plurality of polarization layers. The third polarization layer can be activated by a number of signals from a controller, while the other polarization layers are deactivated. The method can include detecting a third hyperspectral image with an array of pixels from a light source input that is polarized when passed through the third polarization layer. The method can include determining, via a controller coupled to the array of pixels, whether a quality of the third hyperspectral image that was polarized by the third polarization layer meets a threshold. The controller can be configured to analyze the quality of the third hyperspectral image to determine whether or not to save the image in a memory device. If the third hyperspectral image meets a threshold, the third hyperspectral image can be saved in a memory device. If the third hyperspectral image does not meet a threshold, the third hyperspectral image can be discarded.

The method can continue for fourth polarization layer and can also include activating a fourth polarization layer of a plurality of polarization layers. The fourth polarization layer can be activated by a number of signals from a controller, while the other polarization layers are deactivated. The method can include detecting a fourth hyperspectral image with an array of pixels from a light source input that is polarized when passed through the fourth polarization layer. The method can include determining, via a controller coupled to the array of pixels, whether a quality of the fourth hyperspectral image that was polarized by the fourth polarization layer meets a threshold. The controller can be configured to analyze the quality of the fourth hyperspectral image to determine whether or not to save the image in a memory device. If the fourth hyperspectral image meets a threshold, the fourth hyperspectral image can be saved in a memory device. If the fourth hyperspectral image does not meet a threshold, the fourth hyperspectral image can be discarded.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   activating a first polarization layer of a plurality of polarization layers of a stacked polarizer and deactivating a second polarization layer, a third polarization layer, and a fourth polarization layer of the plurality of polarization layers of the stacked polarizer via signals from a controller;
   transmitting light from a hyperspectral light source through the first polarization layer, the second polarization layer, the third polarization layer, and the fourth polarization layer, wherein the hyperspectral light source is polarized by the first polarization layer when transmitted through the first polarization layer and wherein the hyperspectral light source is unpolarized by the second, third and fourth polarization layers when transmitted through the second, third and fourth polarization layers in response to deactivating the second, third and fourth polarization layers via the signals from the controller;
   detecting a first hyperspectral image with an array of pixels from the hyperspectral light source that is polarized by the first polarization layer when the hyperspectral light source is passed through the first, second, third, and fourth polarization layers; and
   storing data representing the first hyperspectral image in a memory device.

2. The method of claim 1, further including deactivating the first polarization layer and activating the second polarization layer of the plurality of polarization layers.

3. The method of claim 2, further including detecting a second hyperspectral image with the array of pixels from the hyperspectral light source that is polarized when the hyperspectral light source is passed through the second polarization layer.

4. The method of claim 2, further including deactivating the first and second polarization layers and activating the third polarization layer of the plurality of polarization layers.

5. The method of claim 4, further including detecting a third hyperspectral image with the array of pixels from the hyperspectral light source that is polarized when the hyperspectral light source is passed through the third polarization layer.

6. The method of claim 5, further including deactivating the first, second, and third polarization layers and activating the fourth polarization layer of the plurality of polarization layers.

7. The method of claim 6, further including detecting a fourth hyperspectral image with the array of pixels from the hyperspectral light source that is polarized when the hyperspectral light source is passed through the fourth polarization layer.

8. An apparatus, comprising:
an array of image sensor cells, wherein each image sensor cell of the array of image sensor cells includes:
a hyperspectral sensor coupled to a controller;
a first polarization layer, a second polarization layer, a third polarization layer, a fourth polarization layer of a stacked polarizer, wherein the first, second, third, and fourth polarization layers are coupled to the controller; and
a pixel, wherein each image sensor cell of the array of image sensor cells is coupled to the controller and wherein the controller is configured to:
activate the first polarization layer of the stacked polarizer of the each image sensor cell of the array of image sensor cells, while the second, third, and fourth polarization layers of the stacked polarizer of the each image sensor cells of the array of image sensor cells are deactivated, via a first number of signals from the controller, and cause the array of image sensor cells to detect a first hyperspectral image from a hyperspectral light source that is polarized with the first polarization layer when the hyperspectral light source passes through the first polarization layer in response to activating the first polarization layer via the first number of signals from the controller and the hyperspectral light source is unpolarized by the second, third, and fourth polarization layers when the hyperspectral light source passes through the second, third, and fourth polarization layers in response to deactivating the second, third, and fourth polarization layers via the first number of signals from the controller.

9. The apparatus of claim 8, wherein the controller is configured to activate the second polarization layer of the each image sensor cell of the array of image sensor cells, while the first, third, and fourth polarization layers of the each image sensor cell of the array of image sensor cells are deactivated via a second number of signals from the controller, and cause the array of image sensor cells to detect a second hyperspectral image from the hyperspectral light source that is polarized with the second polarization layer and is unpolarized by the first, third, and fourth polarization layers when the hyperspectral light source passes through the first, second, third, and fourth polarization layers.

10. The apparatus of claim 8, wherein the controller is configured to activate the third polarization layer of the each image sensor cell of the array of image sensor cells, while the first, second, and fourth polarization layers of the each image sensor cell of the array of image sensor cells are deactivated via a third number of signals from the controller, and cause the array of image sensor cells to detect a third hyperspectral image from the hyperspectral light source that is polarized with the third polarization layer and is unpolarized by the first, second, and fourth polarization layers when the hyperspectral light source passes through the first, second, third, and fourth polarization layers.

11. The apparatus of claim 8, wherein the controller is configured to activate the fourth polarization layer of the each image sensor cell of the array of image sensor cells, while the first, second, and third polarization layers of the each image sensor cell of the array of image sensor cells are deactivated via a fourth number of signals from the controller, and cause the array of image sensor cells to detect a fourth hyperspectral image from the hyperspectral light source that is polarized with the fourth polarization layer and is unpolarized by the first, second, and third polarization layers when the hyperspectral light source passes through the first, second, third, and fourth polarization layers.

12. The apparatus of claim 8, wherein the array of image sensor cells includes a first portion of the array of the image sensor cells configured to detect image data within a first range of wavelengths, a second portion of the array of the image sensor cells configured to detect image data within a second range wavelengths, and a third portion of the array of the image sensor cells configured to detect image data within a third range of wavelengths.

13. The apparatus of claim 8, wherein the apparatus is configured to detect hyperspectral images.

14. The apparatus of claim 8, wherein the first polarization layer is configured to polarize a light source at 0°, the second polarization layer is configured to polarize the light source at 45°, the third polarization layer is configured to polarize the light source at 90°, and the fourth polarization layer is configured to polarize the light source at 135°.

15. The apparatus of claim 8, wherein the controller is configured to store hyperspectral image data in a memory array based on light that passed through each of the first, second, third, and fourth polarization layers when activated by the controller.

16. An apparatus, comprising:
a controller;
a hyperspectral sensor coupled to the controller;
a stacked polarizer including a first polarization layer, a second polarization layer, a third polarization layer, and a fourth polarization layer, wherein the first, second, third, and fourth polarization layers are coupled to the controller;
an array of image sensor cells coupled to the controller; and
a memory device coupled to the controller, wherein the controller is configured to:
activate the first polarization layer via a first number of signals from the controller and cause the array of image sensor cells to detect a first hyperspectral image from a hyperspectral light source input that is polarized when passed through the first polarization layer, wherein the hyperspectral light source is unpolarized by the second, third and fourth polarization layers via the first number of signals from the controller when the hyperspectral light source passes through the second, third and fourth polarization layers;
activate the second polarization layer via a second number of signals from the controller and cause the array of image sensor cells to detect a second hyperspectral image from the hyperspectral light source input that is polarized by the second polarization layer when passed through the second polarization layer, wherein the hyperspectral light source remains unpolarized by the first, third and fourth polarization layers via the second number of signals from the controller when the hyperspectral light source passes through the first, third and fourth polarization layers;

activate the third polarization layer via a third number of signals from the controller and cause the array of image sensor cells to detect a third hyperspectral image from the hyperspectral light source input that is polarized by the third polarization layer when passed through the third polarization layer, wherein the hyperspectral light source remains unpolarized by the first, second and fourth polarization layers via the third number of signals from the controller when the hyperspectral light source passes through the first, second and fourth polarization layers; and activate the fourth polarization layer via a fourth number of signals from the controller and cause the array of image sensor cells to detect a fourth hyperspectral image from the hyperspectral light source input that is polarized when passed through the fourth polarization layer, wherein the hyperspectral light source remains unpolarized by the first, second and third polarization layers via the fourth number of signals from the controller when the hyperspectral light source passes through the first, second and third polarization layers.

17. The apparatus of claim 16, wherein the first, second, third, and fourth images are saved in hyperspectral format in the memory device.

18. The apparatus of claim 16, wherein the array of image sensor cells includes a first portion of pixels configured to detect image data within a first range of wavelengths, a second portion of pixels configured to detect image data within a second range of wavelengths, and a third portion of pixels configured to detect image data within a third range of wavelengths.

19. The apparatus of claim 16, wherein the first polarization layer is configured to polarize a light source at 0°, the second polarization layer is configured to polarize the light source at 45°, the third polarization layer is configured to polarize the light source at 90°, and the fourth polarization layer is configured to polarize the light source at 135°.

20. The apparatus of claim 16, wherein the controller is configured to deactivate the first, second, third, and fourth polarization layers and cause the array of image sensor cells to detect a fifth image from the hyperspectral light source input that is unpolarized when passed through the first, second, third, and fourth polarization layers.

* * * * *